United States Patent
Balamurali et al.

(10) Patent No.: US 12,068,703 B2
(45) Date of Patent: Aug. 20, 2024

(54) MOTOR DRIVE OPTIMIZATION SYSTEM AND METHOD

(71) Applicants: MAGNA INTERNATIONAL INC., Aurora (CA); UNIVERSITY OF WINDSOR, Windsor (CA); Aiswarya Balamurali, Windsor (CA); Philip Korta, Troy, MI (US); Shruthi Mukundan, Windsor (CA); Anik Animesh, Windsor (CA); Narayan Chandra Kar, Windsor (CA); Lakshmi Varaha Iyer, Troy, MI (US); Gerd Schlager, St. Valentin (AT)

(72) Inventors: Aiswarya Balamurali, Windsor (CA); Philip Korta, Troy, MI (US); Shruthi Mukundan, Windsor (CA); Anik Animesh, Windsor (CA); Narayan Chandra Kar, Windsor (CA); Lakshmi Varaha Iyer, Troy, MI (US); Gerd Schlager, St. Valentin (AT)

(73) Assignees: MAGNA INTERNATIONAL INC., Aurora (CA); UNIVERSITY OF WINDSOR, Windsor (CA)

( * ) Notice: Subject to any disclaimer, the term of this patent is extended or adjusted under 35 U.S.C. 154(b) by 0 days.

(21) Appl. No.: 17/613,713

(22) PCT Filed: May 29, 2020

(86) PCT No.: PCT/US2020/035294
§ 371 (c)(1),
(2) Date: Nov. 23, 2021

(87) PCT Pub. No.: WO2020/243549
PCT Pub. Date: Dec. 3, 2020

(65) Prior Publication Data
US 2022/0231624 A1    Jul. 21, 2022

Related U.S. Application Data

(60) Provisional application No. 62/854,628, filed on May 30, 2019.

(51) Int. Cl.
*H02P 21/14* (2016.01)
*B60L 15/02* (2006.01)
(Continued)

(52) U.S. Cl.
CPC .......... *H02P 21/141* (2013.01); *B60L 15/025* (2013.01); *H02P 6/08* (2013.01);
(Continued)

(58) Field of Classification Search
CPC ...... H02P 21/141; H02P 6/08; H02P 21/0003; H02P 21/06; H02P 27/085;
(Continued)

(56) References Cited

U.S. PATENT DOCUMENTS 6,756,758 B2 * 6/2004 Karikomi ............... G05D 19/02
318/434
7,368,886 B2 * 5/2008 Hsieh ................... G01R 31/343
318/434

(Continued)

OTHER PUBLICATIONS

European Patent Office Communication, dated Sep. 8, 2022, 9 pgs.

*Primary Examiner* — David Luo
(74) *Attorney, Agent, or Firm* — Dickinson Wright PLLC

(57) ABSTRACT

A motor drive system and method for determining an optimized efficiency of the motor drive system are provided. The motor drive system includes a system controller, a motor drive having includes an inverter configured to generate the AC power upon one or more motor leads, and an electric motor, which is to convert the AC power from the motor leads to rotational energy. A dynamometer may include a load coupled to the shaft and sensors to measure (Continued)

to measure operating characteristics such as torque and speed of the electric motor. The system controller is configured to generate a lookup table, with an entry describing an output current command for operating the inverter and the motor at a maximum system efficiency for a given combination rotational speed and output torque. Motor temperature may also be measured and used as an additional index into the lookup table.

20 Claims, 6 Drawing Sheets

(51) Int. Cl.
  *H02P 6/08* (2016.01)
  *H02P 21/00* (2016.01)
  *H02P 21/06* (2016.01)
  *H02P 27/08* (2006.01)

(52) U.S. Cl.
  CPC .......... *H02P 21/0003* (2013.01); *H02P 21/06* (2013.01); *H02P 27/085* (2013.01)

(58) Field of Classification Search
  CPC ........ H02P 21/0025; H02P 21/13; H02P 6/34; H02P 21/22; H02P 27/04; B60L 15/025; B60L 2210/40; B60L 2240/421; B60L 2240/423; B60L 2240/425; B60L 2240/427; B60L 2240/429; B60L 15/2045; Y02T 10/70
  USPC ....................... 318/432, 400.02, 400.01, 700
  See application file for complete search history.

(56) References Cited

U.S. PATENT DOCUMENTS

| | | |
|---|---|---|
| 9,461,578 B2 * | 10/2016 | Katsumata ............. H02P 27/06 |
| 10,148,210 B2 * | 12/2018 | Bazzi ................. H02P 23/0022 |
| 2004/0007997 A1 | 1/2004 | Fu |
| 2004/0245949 A1 | 12/2004 | Ueda et al. |
| 2008/0129243 A1 | 6/2008 | Nashiki |
| 2012/0217916 A1 | 8/2012 | Wu et al. |
| 2013/0154530 A1 | 6/2013 | Hargis |
| 2014/0375236 A1 | 12/2014 | Kim et al. |
| 2017/0085200 A1 | 3/2017 | Campbell et al. |

* cited by examiner

MOTOR DRIVE OPTIMIZATION SYSTEM AND METHOD

CROSS-REFERENCE TO RELATED APPLICATIONS

This U.S. National Stage Patent Application claims the benefit of PCT International Patent Application Serial No. PCT/US2020/035294 filed May 29, 2020 entitled "MOTOR DRIVE OPTIMIZATION SYSTEM AND METHOD" which claims the benefit of and priority to U.S. Provisional Patent Application Ser. No. 62/854,628, filed May 30, 2019, titled "Motor Drive Efficiency Optimization System And Method," the entire disclosures of which are hereby incorporated by reference.

FIELD

The present disclosure relates generally to control methods for an inverter used to convert direct current (DC) electrical power to alternating current (AC). More specifically, the present disclosure relates a method and system operate an inverter of a motor drive to optimize efficiency of a motor drive throughout a variety of operating conditions.

BACKGROUND

Inverters are electrical devices used to convert direct current (DC) electrical power to alternating current (AC). One specific application of inverters is in electric motor drives, also known as variable frequency drives (VFDs) that are used in a variety of applications to provide alternating current (AC) electrical power to an electric motor. Motor drives including inverters are frequently used for powering traction motors in electric vehicles (EVs), such as battery electric vehicles, hybrid electric vehicles (HEVs), and plug-in hybrid electric vehicles (PHEVs). It is desirable to improve efficiency of a traction drive system that includes both the motor drive and the electric motor to reduce energy consumption from the vehicle's battery and to extend driving range.

Conventional electric motor drives generally rely upon solid-state switches to switch a battery via pulse width modulation (PWM) in order to approximate an alternating current waveform on one or more output terminals providing power to the electric motor. Historically, insulated gate bipolar transistors (IGBTs) or metal-oxide-semiconductor field-effect transistors (MOSFETs) are used as the switches. Conventional switching transistors using a silicon substrate have a bandgap of 1.1 electron-volt (eV). Conventional switching transistors and are not generally able to operate at more than 10 kHz to switch the high electrical currents required for motor drive applications.

Wide-bandgap (WBG) devices, such as Silicon carbide (SiC) transistors or Gallium nitride (GaN) transistors have been used recently in motor drive applications to provide high switching frequency operation, with reduced switching losses and reduced motor harmonic loss and DC bus ripple. Costs of the WBG devices are relatively high when compared with conventional solid-state switches such as IGBTs or MOSFETs, which increases the inverter cost. High frequency operation of the motor drive can trigger parasitic components present at the bus bar, across the power electronic device and device module with respect to ground, which causes additional disturbances in the voltage and current waveforms as electromagnetic interference (EMI). Due to pulse width modulation (PWM) and parasitic components, conventional inverters generate common mode noise with respect to the ground. Also, the common mode voltage causes a shaft voltage in a shaft of a motor connected to the motor drive. Such shaft voltage can cause bearing currents when the shaft voltage exceeds a breakdown voltage level of the bearing grease in the motor. Passive filters are traditionally used at the output of the inverter to minimize these issues. However, passive filters increase cost and weight of the system.

In some applications, electric motor drives may also be used to convert AC power to DC power for charging a battery pack in a vehicle. The AC power may be supplied by the electric motor itself, for example, in a regenerative braking mode. Alternatively or additionally, the AC power may be supplied by an external source, such as a fixed charging station attached to the utility power grid.

SUMMARY

According to some embodiments, an electric motor drive system for determining optimized efficiency is provided. The motor drive system includes a system controller having a processor coupled to a machine readable storage memory holding a lookup table. The motor drive system also includes a motor drive having a drive controller and an inverter, the drive controller is configured to control the inverter to generate an alternating current power upon a motor lead, and an electric motor configured to convert the alternating current power from the motor lead to rotational energy upon a shaft. The system controller is configured to determine an output current command for optimized efficiency associated with each of a plurality of different combinations of speed and output torque of the electric motor. The system controller is configured to store the output current commands as entries within the lookup table, with the entries indexed by the speed and the output torque of the electric motor.

According to some embodiments, a first method of operating a motor drive is provided. The first method includes, for each of a plurality of operating condition values of an electric motor: energizing the motor drive to operate the electric motor with one of the plurality of operating condition values; varying an operating parameter of an inverter of the motor drive through a plurality of operating parameter values; measuring a measured value of an attribute associated with operating the electric motor for each operating parameter value within the plurality of operating parameter values; determining an efficiency of one of the electric motor or the motor drive or the combination of the motor and the motor and the motor drive using the measured value of the attribute associated with operating the electric motor; and recording one of the plurality of operating parameter values associated with a peak efficiency as an entry within a lookup table, with the entry being associated with the one of the plurality of operating condition values.

According to some embodiments, a second method of operating a motor drive includes setting an initial motor speed and an initial peak current value and. in response to a predetermined maximum peak current value being reached, initiating a current advance angle to an initial value. The method also includes, in response to a predetermined maximum current advance angle being reached, performing a test for a predetermined period. The method also includes measuring a plurality of attributes associated with operating the motor drive, incrementing the current advance angle by a first predetermined amount, incrementing a peak current value by a second predetermined amount, selecting torque commands of interest, and determining output current commands satisfying a torque demand and voltage constraints based on a surface interpolation of the peak current value, the current advance angle, a direct axis voltage, a quadrature axis voltage, and measured torque. The method also includes selecting the peak current value and the current advance angle corresponding to maximum motor efficiency and combined motor and inverter efficiency for the initial motor speed, and recording the peak current value and the current advance angle as an entry within a first lookup table associated with the initial motor speed.

The present disclosure may be applied to improve the control performance in a permanent magnet (PM) motor drive system compared to conventional systems and techniques by determining an optimal current vector for maximum system efficiency, where the optimal current vector combines the motor and inverter efficiencies, thus further reducing the energy consumption from the battery compared to conventional maximum-torque-per-ampere (MTPA) method. Temperature compensation also improves accuracy in calculating torque output at the shaft, thus further enhancing the features of the subject control strategy.

BRIEF DESCRIPTION OF THE DRAWINGS

Further details, features and advantages of designs of the invention result from the following description of embodiment examples in reference to the associated drawings.

DETAILED DESCRIPTION

Figure 1:
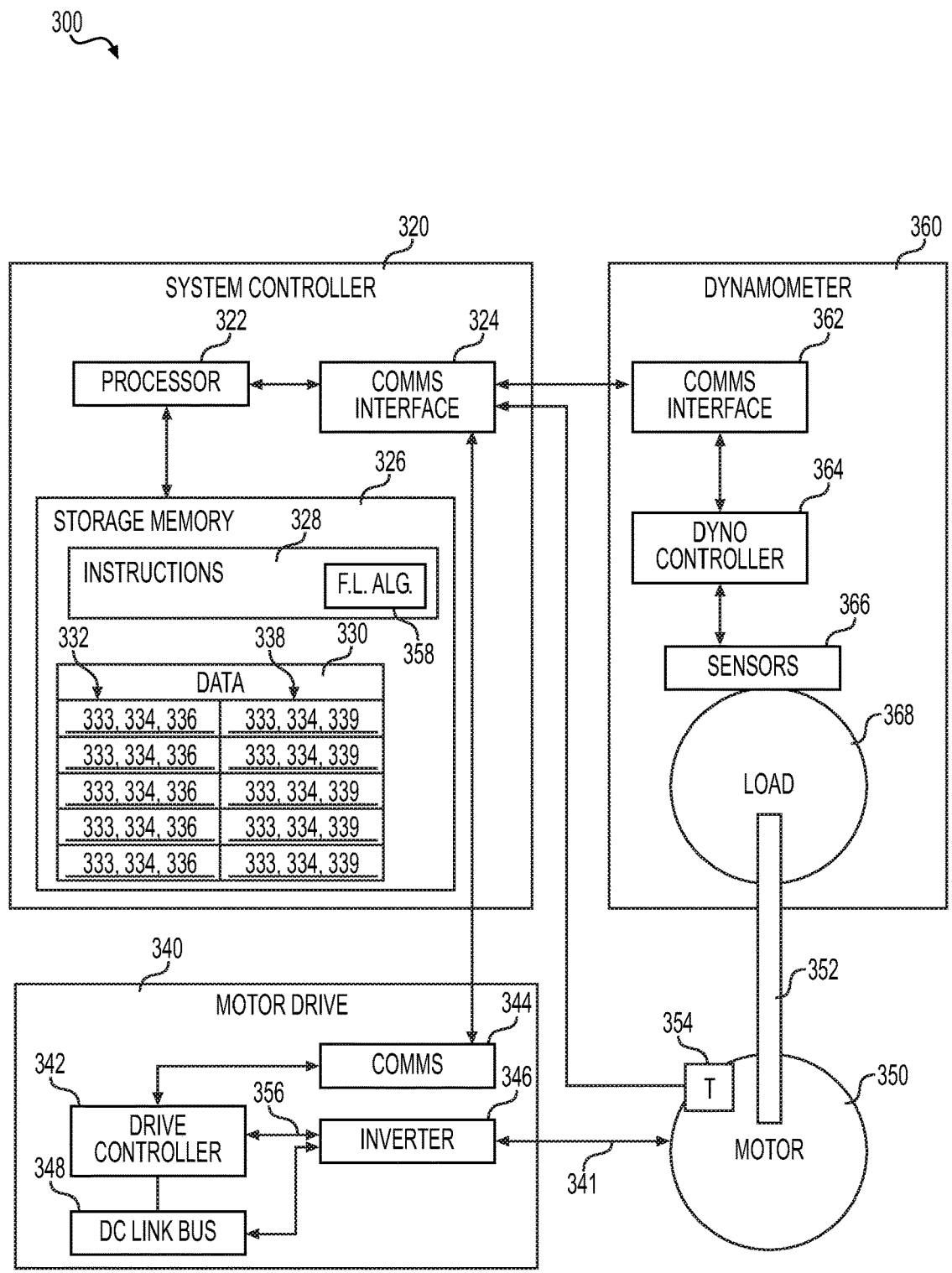
FIG. 1 is a block diagram of a motor drive system in accordance with some embodiments of the present disclosure.

Improvements in control algorithms through optimal selection of the current vector commands and the resultant selection of voltage commands to an inverter can improve efficiency of a motor and motor drive, thus reducing the total battery energy consumption in electric vehicles (EVs). Parameter variations in the electric motor may be considered in order to avoid decreased efficiency due to errors in determining the output current commands at various loads and speeds. In addition to selection of optimal current commands, temperature variations in the motor, which may cause variations in stator winding and magnet properties, may be compensated to improve accuracy in measuring or calculating torque delivery by the electric motor.

The system and methods of the present disclosure may provide efficiency improvements over conventional systems and methods, such as a maximum torque per ampere (MTPA) technique. For example, the proposed method may provide a 2.95% efficiency improvement over a conventional MTPA technique for a system operating at a speed of 2000 RPM and an output torque of 50 Nm.

The present disclosure provides a methodology to populate an offline lookup table (LUT) with output current commands for multiple speeds, torque and temperature inputs to an electric motor. Considering all the controllable losses in the motor and inverter, an optimal current vector to minimize total losses in the motor and inverter, for a given input DC voltage may be determined. An experimental procedure that uses only terminal measurements from a dynamometer setup may be used to determine the current vectors and without knowledge of accurate motor parameters. An additional adjustment to the current vector commands based on a temperature compensation block with magnet flux prediction is designed to compensate for the change in magnet flux. Such temperature compensation may provide for improved accuracy of output torque generation.

Recurring features are marked with identical reference numerals in the figures, in which example embodiments of a motor drive system 300 are is disclosed.

FIG. 1 presents a block diagram of an example motor drive system 300 for determining an optimized efficiency in accordance with some embodiments of the present disclosure. The example motor drive system 300 includes a system controller 320 having a processor 322 coupled to a first communications interface 324, and a machine readable storage memory 326. The processor 322 may include one or more microprocessors, microcontrollers, field programmable gate arrays (FPGAs) and/or special purpose hardware, such as an application specific integrated circuit (ASIC). The machine readable storage memory 326 may include one or more types of memory including, for example, RAM, ROM, optical, magnetic, and flash-based memory. The machine readable storage memory 326 may store instructions 328, which may take the form of an executable program or script, and which may be compiled, interpreted, or otherwise run by the processor 322 and/or another device to cause some action or data manipulation to be undertaken. The machine readable storage memory 326 may also store a plurality of data entries 333 within a data storage region 330. Each of the data entries 333 may record a corresponding first entry 336 or a corresponding second entry 339, thereby providing for the system controller 320 to maintain a lookup table 332, 338, which may be used to correlate one or more operating parameter values for peak efficiency with one or more associated operating condition values, such as speed w and/or torque T. Some or all of the functions performed by the motor drive system 300 may be performed on hardware and/or software that is located in or remotely from the system controller 320, for example, in a remote server.

The example motor drive system 300 also includes a motor drive 340, configured to generate an alternating current (AC) power upon one or more motor leads 341. The motor drive 340 includes a drive controller 342 operatively connected to a second communications interface 344, for communicating with the first communications interface 324 of the system controller 320. The motor drive 340 also includes an inverter 346 configured to receive DC power from a DC link bus 348 and to generate the AC power upon the motor leads 341. The drive controller 342 is in operative communication with the inverter 346 and is configured to control the operation of the inverter 346 to generate the AC power upon the motor leads 341.

The example motor drive system 300 also includes an electric motor 350, which is configured to convert the AC power from the motor leads 341 to rotational energy upon a shaft 352. In some embodiments, the electric motor 350 may be a permanent magnet (PM) motor. A temperature sensor 354 is operatively connected to the electric motor 350 and is configured to measure a temperature within the electric motor 350. The temperature sensor 354 may include one or more temperature probes that may be disposed on or within the electric motor 350. Alternatively or additionally, the temperature sensor 354 may employ non-contact means of measuring the temperature of the electric motor 350, such as by measuring infrared (IR) radiation from the electric motor 350. The temperature sensor 354 is in communication with the first communications interface 324 of the system controller 320 to enable the processor 322 to monitor the temperature of the electric motor 350. In some embodiments, the system controller 320 may be configured to predict the effects of the temperature upon magnet flux within the electric motor 350 in order to more accurately determine an output torque $T_e$ produced by the electric motor 350.

In some embodiments, the electric motor 350 is a permanent magnet (PM) synchronous machine having a rotor with one or more permanent magnets (not shown in the FIGS.). Permanent magnets within the electric motor 350 produce a magnetic flux that can vary with factors such as temperature. Variation in the magnetic flux produced by permanent magnets can impact the performance of the electric motor 350. For example, a permanent magnet having a reduced magnetic flux value will generally produce a lower output torque $T_e$ for a given input voltage and current.

In some embodiments, the system 300 includes a flux linkage determination algorithm 358 configured to determine a value of the magnetic flux produced by the permanent magnets within the rotor of the electric motor 50. The system controller 320 may be configured to adjust the output current command based upon the value of the magnetic flux. Therefore, the system 300 may produce an output torque $T_e$ that takes into account effects of temperature on the permanent magnets within the rotor of the electric motor 350. The flux linkage determination algorithm 358 may take the form of a software module within the instructions 328 executed by the processor 322 of the system controller 320, as shown in FIG. 1. The flux linkage determination algorithm 358 may take other forms including dedicated hardware and/or software. The flux linkage determination algorithm 358 may be integrated within the motor drive 340 and/or the system controller 320. The flux linkage determination algorithm 358 may be configured to determine an absolute value of the magnetic flux and/or a variance from a nominal value of the magnetic flux produced by the permanent magnets within the rotor of the electric motor 350.

In some embodiments, the flux linkage determination algorithm 358 may use the temperature within the electric motor to determine the value of the magnetic flux produced by the permanent magnets within the rotor of the electric motor 350. For example, the flux linkage determination algorithm 358 may determine the value of the magnetic flux to be X % below a nominal flux value in response to the rotor of the electric motor 350 being Y degrees above a nominal temperature (e.g., room temperature). In some embodiments, the flux linkage determination algorithm 358 may use a stator temperature of a stator of the electric motor 350, as measured by the temperature sensor 354, together with an analytical model to relate that stator temperature to a rotor temperature of the rotor of the electric motor 350 in order to determine the value of the magnetic flux. The correspondence between the value of the magnetic flux and the rotor temperature may be determined algorithmically (i.e., by calculation) and/or by other methods, such as by using one or more lookup tables. Similarly, correspondence between the value of the magnetic flux and the stator temperature (or another measured or calculated temperature) may be determined algorithmically (i.e., by calculation) and/or by other methods, such as by using one or more lookup tables.

Alternatively or additionally, the flux linkage determination algorithm 358 may use one or more operational parameters of the motor drive 340 to determine the value of the magnetic flux produced by the permanent magnets within the rotor of the electric motor 350. For example, the flux linkage determination algorithm 358 may use direct and quadrature axis currents and voltages $I_d$, $I_q$, $V_d$, $V_q$, and/or rotational speed $\omega$ to determine the value of the magnetic flux. In some embodiments, the flux linkage determination algorithm 358 may use historical values, or values over some period of time, of the measured or calculated temperature within the electric motor and/or the operational parameters of the motor drive 340 to determine the value of the magnetic flux produced by the permanent magnets within the rotor of the electric motor 350. The correspondence between the value of the magnetic flux and the operational parameters of the motor drive 340 may be determined algorithmically (i.e., by calculation) and/or by other methods, such as by using one or more lookup tables.

In operation, the system controller 320 is configured to determine an output current command 334 for optimized efficiency associated with each of a plurality of different combinations of speed and output torque $T_e$ of the electric motor 350. In some embodiments, the output current commands 334 for optimized efficiency may be associated with a combination of the temperature, speed, and output torque $T_e$ of the electric motor 350. The output current command 334 may be provided by the drive controller 42 to the inverter 346 to control the operation of the inverter 346. The output current command 334 may take several different forms including, for example, as a direct axis current $I_d$ and a quadrature axis current $I_q$. Alternatively or additionally, the output current command 334 may take the form of a peak current value $I_s$ and a current advance angle ($\gamma$).

The system controller 320 is also configured to store the output current commands 334 as entries 336, 339 within a lookup table 332, 338 indexed by a rotational speed w and an output torque $T_e$ of the electric motor 350, and may be given in any relevant units, such as Newton-meters (Nm) or pound-foot (lbf·ft). In some embodiments, the entries 336, 339 within the lookup table 332, 338 may also be indexed by a temperature t of the electric motor 50. Example lookup tables 332, 338 are shown in Tables I and II, below. The rotational speed $\omega$ is a rotational speed of the shaft 352, and may be given in any relevant units, such as radians/second or in revolutions per minute (RPM). The temperature t may be an internal temperature within the electric motor 350, which may impact the operation and efficiency of the electric motor 350 as a result of temperature-dependent effects upon components within the electric motor 350, such as windings and/or permanent magnets.

In some embodiments, and as also shown in FIG. 1, the system controller 320 also includes a dynamometer 360 for measuring the rotational speed w and the output torque $T_e$ of the electric motor 350. The dynamometer 360 includes a third communications interface 362 configured to communicate with the first communications interface 324 of the system controller 320. The dynamometer 360 also includes a dyno controller 364, which may include one or more processors, such as a microprocessor or microcontroller. The dynamometer 360 also includes a load 368 coupled to the shaft 352, and one or more sensors 366 configured to measure operating characteristics of the electric motor 350.

The dyno controller 364 is configured to monitor signals from the sensors 366 and to measure the rotational speed ω and the output torque $T_e$ of the electric motor 350. The system controller 320 is in communication with the dyno controller 364 for receiving data indicating the rotational speed w and the $T_e$ of the electric motor 350.

point, the MPTA method provides a system efficiency of 79.53%, and the subject method provides a system efficiency of 82.48%, which is 2.95% higher than the MTPA method. The second operating point includes the electric motor 350 at a rotational speed ω of 2000 RPM and an output torque $T_e$ of 25 Nm. At the second operating point, the MPTA

TABLE I (332) - LOOKUP TABLE WITH OUTPUT CURRENT COMMANDS
AS PEAK CURRENT AND CURRENT ADVANCE ANGLE VALUES

|  | $\omega_1$ | $\omega_2$ | $\omega_3$ | $\omega_m$ |
|---|---|---|---|---|
| $T_{e1}$ | $I_{s11}, \gamma_{11}$ (334, 336) | $I_{s12}, \gamma_{12}$ (334, 336) | $I_{s13}, \gamma_{13}$ (334, 336) | $I_{s1m}, \gamma_{1m}$ (334, 336) |
| $T_{e2}$ | $I_{s21}, \gamma_{21}$ (334, 336) | $I_{s22}, \gamma_{22}$ (334, 336) | $I_{s23}, \gamma_{23}$ (334, 336) | $I_{s2m}, \gamma_{2m}$ (334, 336) |
| $T_{e3}$ | $I_{s31}, \gamma_{31}$ (334, 336) | $I_{s32}, \gamma_{32}$ (334, 336) | $I_{s33}, \gamma_{33}$ (334, 336) | $I_{s3m}, \gamma_{3m}$ (334, 336) |
| $T_{em}$ | $I_{sm1}, \gamma_{m1}$ (334, 336) | $I_{sm2}, \gamma_{m2}$ (334, 336) | $I_{sm3}, \gamma_{m3}$ (334, 336) | $I_{smm}, \gamma_{mm}$ (334, 336) |

Table I is an example of a first lookup table 332 in accordance with aspects of the present disclosure. Specifically, the first lookup table 332 includes several first entries 336, with each of the first entries 336 associated with a specific combination a rotational speed ω, and an output torque $T_e$. Each of the first entries 336 describes an output current command 334 in the form of a peak current value $I_m$ and a current advance angle γ.

TABLE II (338) - LOOKUP TABLE WITH OUTPUT CURRENT COMMANDS
AS DIRECT AND QUADRATURE CURRENTS

|  | $\omega_1$ | $\omega_2$ | $\omega_3$ | $\omega_m$ |
|---|---|---|---|---|
| $T_{e1}$ | $I_{d11}, I_{q11}$ (334, 339) | $I_{d12}, I_{q12}$ (334, 339) | $I_{d13}, I_{q13}$ (334, 339) | $I_{d1m}, I_{q1m}$ (334, 339) |
| $T_{e2}$ | $I_{d21}, I_{q21}$ (334, 339) | $I_{d22}, I_{q22}$ (334, 339) | $I_{d23}, I_{q23}$ (334, 339) | $I_{d2m}, I_{q2m}$ (334, 339) |
| $T_{e3}$ | $I_{d31}, I_{q31}$ (334, 339) | $I_{d32}, I_{q32}$ (334, 339) | $I_{d33}, I_{q33}$ (334, 339) | $I_{d3m}, I_{q3m}$ (334, 339) |
| $T_{em}$ | $I_{dm1}, I_{qm1}$ (334, 339) | $I_{dm2}, I_{qm2}$ (334, 339) | $I_{dm3}, I_{qm3}$ (334, 339) | $I_{dmm}, I_{qmm}$ (334, 339) |

Table II is an example of a second lookup table 338 in accordance with aspects of the present disclosure. Specifically, the second lookup table 338 includes several second entries 339, with each of the second entries 339 associated with a specific combination a rotational speed ω, and an output torque $T_e$. Each of the second entries 339 describes an output current command 334 in the form of a direct axis current $I_d$ and a quadrature axis current $I_q$.

TABLE III

COMPARISON OF SYSTEM EFFICIENCY FOR
SAMPLE OPERATING POINTS OF TEST PMSM

| Operating Point | MTPA Efficiency (%) | Proposed Method Efficiency (%); Difference from MTPA |
|---|---|---|
| 2000 RPM, 50 Nm | 79.53 | 82.48; 2.95% |
| 2000 RPM, 25 Nm | 76.3 | 78.6; 2.3% |

Table III compares system efficiency for sample operating points of a permanent magnet synchronous motor (PMSM). Table III compares the efficiency of a system operated in accordance with a method of the present disclosure with a system using a conventional maximum-torque-per-ampere (MTPA) method. Specifically, Table III describes two example operating points. The first operating point includes the electric motor 350 at a rotational speed ω of 2000 RPM and an output torque $T_e$ of 50 Nm. At the first operating method provides a system efficiency of 76.3%, and the subject method provides a system efficiency of 78.6%, which is 2.3% higher than the MTPA method.

Figure 2:
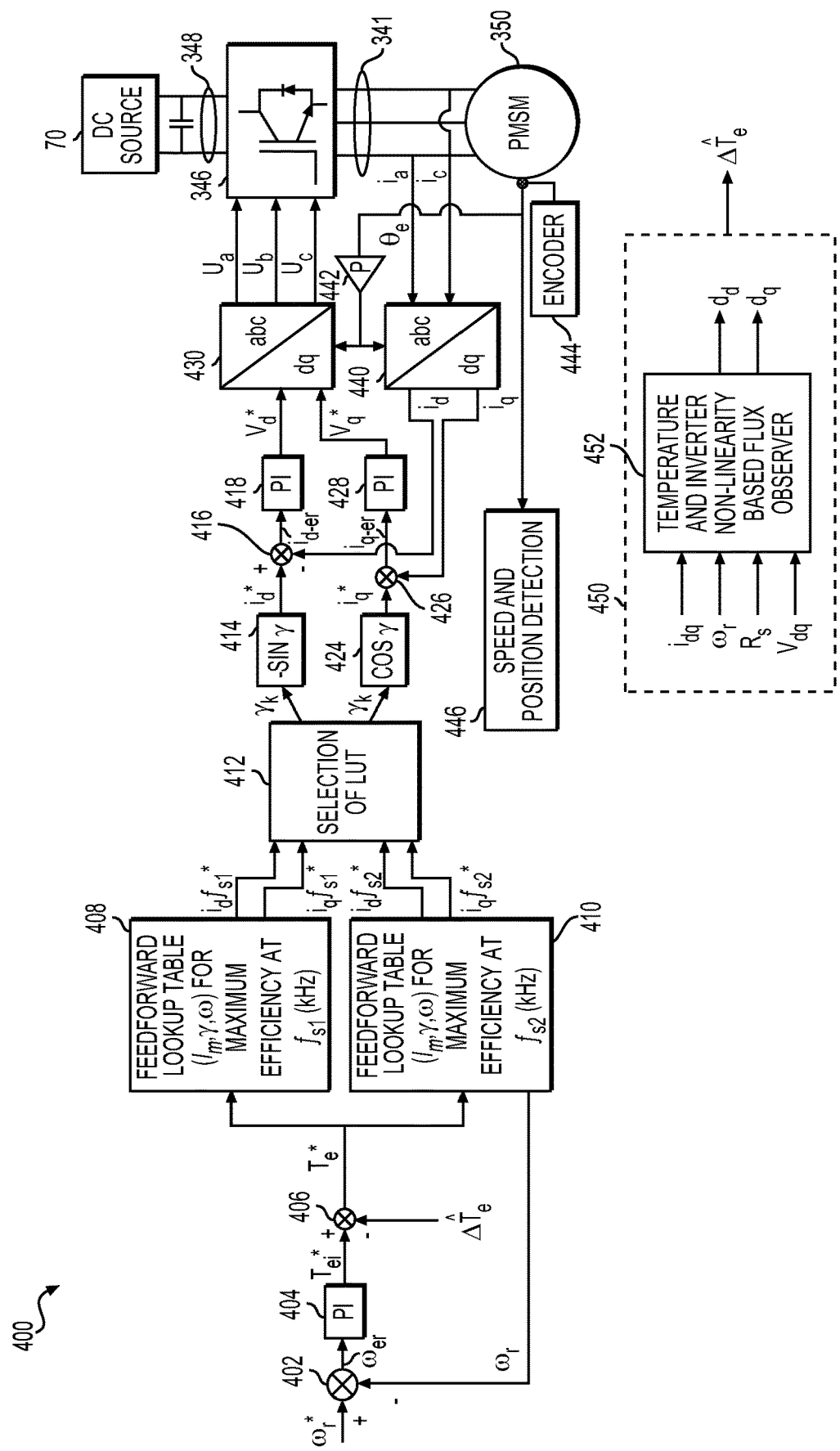
FIG. 2 is a schematic block diagram of a motor drive controller in accordance with some embodiments of the present disclosure.

FIG. 2 is a schematic block diagram of a motor drive controller 400 in accordance with some embodiments of the present disclosure. The motor drive controller 400 is configured to control operation of the inverter 346 for driving the electric motor 350. The motor drive controller 400 includes a first difference block 402, which calculates an error speed $\omega_{er}$ as a difference between a command speed $\omega_r^*$ and an actual rotor speed $\omega_r$ of the electric motor 350. The motor drive controller 400 also includes a speed control loop 404 that is configured to generate an initial torque command $T_{ei}^*$ based upon the error speed $\omega_{er}$. The speed control loop 404 may be a proportional-integral type controller, although other types of control loops may be used, such as a proportional-integral-derivative control loop. The motor drive controller 400 also includes a second difference block 406, which calculates a final torque command $T_e^*$ as a difference between the initial torque command $T_{ei}^*$ and a torque compensation signal $\Delta\hat{T}_e$.

In some embodiments, the inverter 346 is configured to operate using two or more different switching frequencies $f_{s1}, f_{s2}$ including a first switching frequency $f_{s1}$, and a second switching frequency $f_{s2}$ which is greater than the first switching frequency $f_{s1}$. The inverter 346 may use the different switching frequencies $f_{s1}, f_{s2}$ at corresponding rotor speeds $\omega_r$, which may also be called rotational speeds ω. The different switching frequencies $f_{s1}, f_{s2}$ can further improve the efficiency of the motor drive 340 when compared to a motor drive that uses a single switching frequency.

The motor drive controller 400 includes a first feedforward lookup table 408 for determining operating parameters to cause the electric motor 350 or the motor drive 340 or a combination of the electric motor 350 and the motor drive 340 to operate at a maximum efficiency when the inverter 346 is operating at the first switching frequency $f_{s1}$. The motor drive controller 400 also includes a second feedforward lookup table 410 for determining operating parameters to cause the electric motor 350 or the motor drive 340 or a combination of the electric motor 350 and the motor drive 340 to operate at a maximum efficiency when the inverter 346 is operating at the second switching frequency $f_{s2}$. Each of the feedforward lookup tables 408, 410 may include, for example, a correlation between the final torque command $T_e^*$ and the rotational speed ω with a peak current $I_m$ and current advance angle γ.

The motor drive controller 400 includes a selection block 412 to determine one of the feedforward lookup tables 408, 410 to use, depending on the switching frequency $f_{s1}$, $f_{s2}$ of the inverter (or depending on a corresponding rotational speed ω of the electric motor 350).

In some embodiments, and as shown in FIG. 2, the selection block 412 outputs a current advance angle value $γ_k$ from a selected one of the feedforward lookup tables 408, 410 and which corresponds to the final torque command $T_e^*$ and the rotational speed ω of the electric motor 350. The current advance angle value $γ_k$ may be provided to a direct-axis current calculator 414 that is configured to calculate a direct-axis current command $i_d^* = -\text{SIN } γ_k$. The current advance angle value $γ_k$ may also be provided to a quadrature-axis current calculator 424 that is configured to calculate a quadrature-axis current command $i_q^* = \text{COS } γ_k$. In some other embodiments, the selection block 412 may directly output the direct-axis current command $i_d^*$ and the quadrature-axis current command $i_q^*$ using values stored in one of the feedforward lookup tables 408, 410, without the intermediate step of determining a current advance angle value $γ_k$.

The motor drive controller 400 also includes a third difference block 416, which calculates a direct-axis current error $i_{d\_error}$ as a difference between the direct-axis current command $i_d^*$ and an actual direct-axis current $i_d$ supplied to the electric motor 350. The motor drive controller 400 also includes a first current control loop 418 that is configured to generate a direct-axis voltage command $V_d^*$ based upon the direct-axis current error $i_{d\_error}$. The first current control loop 418 may be a proportional-integral type controller, although other types of control loops may be used, such as a proportional-integral-derivative control loop.

The motor drive controller 400 also includes a fourth difference block 426, which calculates a quadrature-axis current error $i_{q-er}$ as a difference between the quadrature-axis current command $i_q^*$ and an actual quadrature-axis current $i_q$ supplied to the electric motor 350. The motor drive controller 400 also includes a second current control loop 428 that is configured to generate quadrature-axis voltage command $V_q^*$ based upon the quadrature-axis current error $i_{q-er}$. The second current control loop 428 may be a proportional-integral type controller, although other types of control loops may be used, such as a proportional-integral-derivative control loop.

Still referring to FIG. 2, the motor drive controller 400 also includes a first transformation block 430 configured to calculate time-domain voltage commands $u_a$, $u_b$, $u_c$ based upon the direct-axis voltage command $V_d^*$ and the quadrature-axis voltage command $V_q^*$. The time-domain voltage commands $u_a$, $u_b$, $u_c$ are then used by the inverter 346 to produce corresponding phase voltages upon the motor leads 341.

The motor drive controller 400 also includes a second transformation block 440 configured to measure motor currents $i_a$, $i_c$ upon the motor leads 341 and to calculate the corresponding actual direct-axis current $i_d$ and the actual quadrature-axis current $i_q$ supplied to the electric motor 350.

The motor drive controller 400 also includes a gain block 442 configured to amplify an electrical position signal $θ_e$ of the electric motor 350 and to provide a corresponding signal to each of the transformation blocks 430, 440. In some embodiments, and as shown in FIG. 2, the electrical position signal $θ_e$ is also used by an encoder 444 and a speed and position detection block 446 to determine the rotational speed ω and position of the electric motor 350.

Still referring to FIG. 2, the motor drive controller 400 also includes a torque compensation calculator 450 configured to calculate the torque compensation signal $Δ\hat{T}_e$. Specifically, the torque compensation calculator 450 includes a disturbance observer module 452, which may also be called a "flux observer" or, more specifically, a "temperature and inverter non-linearity based flux observer." The disturbance observer module 452 is configured to calculate a direct-axis disturbance value $d_d$ and a quadrature-axis disturbance value $d_q$. The torque compensation calculator 450 then uses those disturbance values $d_d$, $d_q$ to calculate the torque compensation signal $Δ\hat{T}_e$. In some embodiments, and as shown in FIG. 2, the disturbance observer module 452 calculates the disturbance values $d_d$, $d_q$ based upon the actual direct-axis and quadrature-axis output currents $i_{dq}$, a rotor speed $ω_r$ of the electric motor 350 (which may also be called the rotational speed ω, more generally), a stator resistance $R_s$ of the electric motor 350, and an input voltage $V_{dq}$, which includes direct-axis voltage command $V_d^*$ and the quadrature-axis voltage command $V_q^*$ used to command the inverter 346. In some embodiments and as shown, for example, in FIG. 2, the input voltage $V_{dq}$ is generated by the current control loops 418, 428.

VSI Nonlinearity And Temperature Variation Observer:

In accordance with some embodiments, present disclosure provides a system and method to observe and compensate voltage disturbances due to changes in operating temperature and non-linear inverter effects. Such a voltage disturbance compensation model predicts flux linkage disturbances in the electric motor 350 due to the temperature and inverter non-linearity. The disturbance model can be used to reduce or further reduce the number of LUTs 408, 410, to further improve the performance of the motor drive 340 and/or the electric motor 350. In EV applications, the voltage disturbance compensation system may provide more accurate control in real-time driving conditions. The disturbance model can observe and compensate for variations due to permanent magnet (PM) flux and stator resistance which can result, for example, from changes in the operating temperature. For example, increasing operating temperature is typically associated with a decrease in PM flux λ and an increase in stator resistance $R_S$.

Stator temperature $R_S$ is easily available in electric motors 350, such as those used in EV drive systems. However, the rotor temperature and subsequently, the PM flux linkage variation cannot be easily obtained through onboard measurements. In order to avoid tedious offline calculations and temperature measurements, a voltage based flux observer can be used to determine the disturbances due to changing parameters with operating temperature. Additionally, or alternatively, the nonlinearity observed in the control loop due to inverter deadtime effects may also be included. The inverter deadtime may cause distortion of the output voltage from the inventor, thus affecting the control performance through phase current distortion and torque pulsations. Thus, the total flux in the dq axis is affected due to the above-mentioned non-linearities. By combining the maximum efficiency LUT generated with the disturbance in the motor can be compensated for, thus providing highly accurate control performance. A general state-space representation of a PMSM system may be derived using equation (1), below.

$$\dot{x} = Ax + B_0 u + B_1 d$$

$$y = Cx \quad (1)$$

where x is the state vector, u and d are the input and external disturbance, respectively, and A, B0, B1 and C represent the coefficient matrices of the state functions. The deadtime is an intentional switching delay time in inverters to prevent short circuiting of the DC link. This effect causes distortion of the output voltage from the inverter, thus affecting the control performance. From (1), the linear form of motor-drive equations can be written as given in (2)

$$\begin{bmatrix} v_{ds}^* \\ v_{qs}^* \end{bmatrix} = R_s \begin{bmatrix} i_{ds} \\ i_{qs} \end{bmatrix} + \begin{bmatrix} L_d \\ & L_q \end{bmatrix} p \begin{bmatrix} i_{ds} \\ i_{qs} \end{bmatrix} + \begin{bmatrix} -\omega_r L_q i_{qs} \\ \omega_r (L_d i_{ds}) \end{bmatrix} + \begin{bmatrix} \Delta v_{d,dead} \\ \Delta v_{q,dead} + \omega_r \Delta \lambda_{PM} \end{bmatrix} \quad (2)$$

where $v_{ds}^*$ and $v_{qs}^*$ are the commanded voltages from the current regulator, $\Delta v_{d,dead}$ and $\Delta v_{q,dead}$ are the disturbances due to inverter deadtime in the d- and q-axis respectively, $\Delta \lambda_{PM}$ is the change in PM flux linkage due to temperature in the magnet. The net disturbances in the d- and q-axis can be written in (3).

$$d_d = \Delta v_{d,dead}$$

$$d_q = \Delta v_{q,dead} + \omega_r \Delta \lambda_{PM} \quad (3)$$

The state equation and output of the PMSM can be written in (4) based on the motor resistance, $R_s$, inductances $L_d$ and $L_q$ and the measured currents from the controller, $i_{ds}$ and $i_{qs}$.

$$\frac{d}{dt} \begin{bmatrix} i_{ds} \\ \Delta v_{d,dead} \end{bmatrix} = \begin{bmatrix} -\frac{R_s}{L_d} & \frac{-1}{L_d} \\ 0 & 0 \end{bmatrix} \begin{bmatrix} i_{ds} \\ \Delta v_{d,dead} \end{bmatrix} + \begin{bmatrix} \frac{1}{L_d} \\ 0 \end{bmatrix} (v_{ds}^* + \omega_r L_q i_{qs}) \quad (4)$$

$$\frac{d}{dt} \begin{bmatrix} i_{qs} \\ \Delta v_{q,dead} + \omega_r \Delta \lambda_{PM} \end{bmatrix} =$$

$$\begin{bmatrix} -\frac{R_s}{L_q} & \frac{-1}{L_q} \\ 0 & 0 \end{bmatrix} \begin{bmatrix} i_{qs} \\ \Delta v_{q,dead} + \omega_r \Delta \lambda_{PM} \end{bmatrix} + \begin{bmatrix} \frac{1}{L_q} \\ 0 \end{bmatrix} (v_{qs}^* + \omega_r L_d i_{ds})$$

Further, the disturbance module can be determined from observer gains $G_1$ and $G_2$ in the d-axis for determination of disturbances due to inverter non-linearity, $V_{d,dead}$ and $G_3$ and $G_4$ in the q-axis for $V_{q,dead}$ and $\omega_r \lambda_{PM}$ for the change in PM flux linkage due to temperature.

$$\frac{d}{dt} \begin{bmatrix} \hat{i}_{ds} \\ \Delta \hat{v}_{d,dead} \end{bmatrix} = \begin{bmatrix} -G_1 - \frac{R_s}{L_d} & \frac{-1}{L_d} \\ -G_2 & 0 \end{bmatrix} \quad (5)$$

$$\begin{bmatrix} \hat{i}_{ds} \\ \Delta \hat{v}_{d,dead} \end{bmatrix} + \begin{bmatrix} G_1 \\ G_2 \end{bmatrix} i_{ds} + \begin{bmatrix} \frac{1}{L_d} \\ 0 \end{bmatrix} (v_{ds}^* + \omega_r L_q i_{qs})$$

$$\frac{d}{dt} \begin{bmatrix} \hat{i}_{qs} \\ \Delta \hat{v}_{q,dead} + \omega_r \Delta \lambda_{PM} \end{bmatrix} =$$

$$\begin{bmatrix} -G_3 - \frac{R_s}{L_q} & \frac{-1}{L_q} \\ -G_4 & 0 \end{bmatrix} \begin{bmatrix} \hat{i}_{qs} \\ \Delta \hat{v}_{q,dead} \end{bmatrix} + \begin{bmatrix} G_3 \\ G_4 \end{bmatrix} i_{qs} + \begin{bmatrix} \frac{1}{L_q} \\ 0 \end{bmatrix} (v_{qs}^* - \omega_r L_d i_{ds})$$

To determine the disturbances $d_d$ and $d_q$, the disturbance observer module 452 receives the input voltage and output current and speed, along with stator resistance value from the controller. The input voltage many include the $d_q$-axis voltages calculated by the controller in the rotor reference frame, which, is generally the output of the PI controller of the current control loop (e.g., which may be related to the voltage that is applied to the motor but is not exactly the voltage applied to the motor leads due to the inverter non-linearity). The observer gains $G_1$, $G_2$, $G_3$ and $G_4$ can be selected based on the necessary conditions for a stable observer with fast convergence properties.

Disturbance Compensation:

Once the disturbances $d_d$ and $d_q$ due to temperature variation and inverter non-linearity are determined, the corresponding voltages can be compensated in the control loop for improved torque and efficiency. To avoid generating multiple LUTs and including temperature sensor for tracking the varying temperature and to reduce complexity, a temperature and inverter non-linearity compensation loop 452 may be added based on the calculated disturbances to complement the maximum efficiency lookup tables 408, 410 that do not consider the temperature variations. The temperature and inverter non-linearity compensation loop 452 can, therefore, compensate for varying rotor temperature Tr without the cost and complexity of a sensor to directly measure the rotor temperature Tr, and without additional lookup tables 408, 410 based on varying temperature.

In some embodiments, the disturbance compensation voltage may be applied after the current PI of the controller 400, before the selection (i.e., before selection block 412) of the voltage commands to the inventor, as is shown in FIG. 2. The estimated voltage error for compensation of temperature variation effects and inverter non-linearity can be added into the voltage calculation loop to achieve improved control performance.

Generation of LUT for Varying Switching Frequency (Operating Parameter) and Recording Corresponding Maximum Efficiency Operating Points:

In some embodiments, the switching frequency may be considered as an additional control variable for improving the efficiency while generating the LUT. The LUT, by varying the $i_d$, $i_q$ and speed, was first generated for many switching frequencies. Once the LUTs are generated, based on the peak efficiency points for the system, the operating switching frequencies may be divided into switching frequency operation zones. By varying the switching frequencies, the efficiency of the motor drive 340 can be further enhanced compared to a single switching frequency operation that is done conventionally. It should be understood that any number of switching frequencies may be used by the systems and methods described herein.

Figure 6:
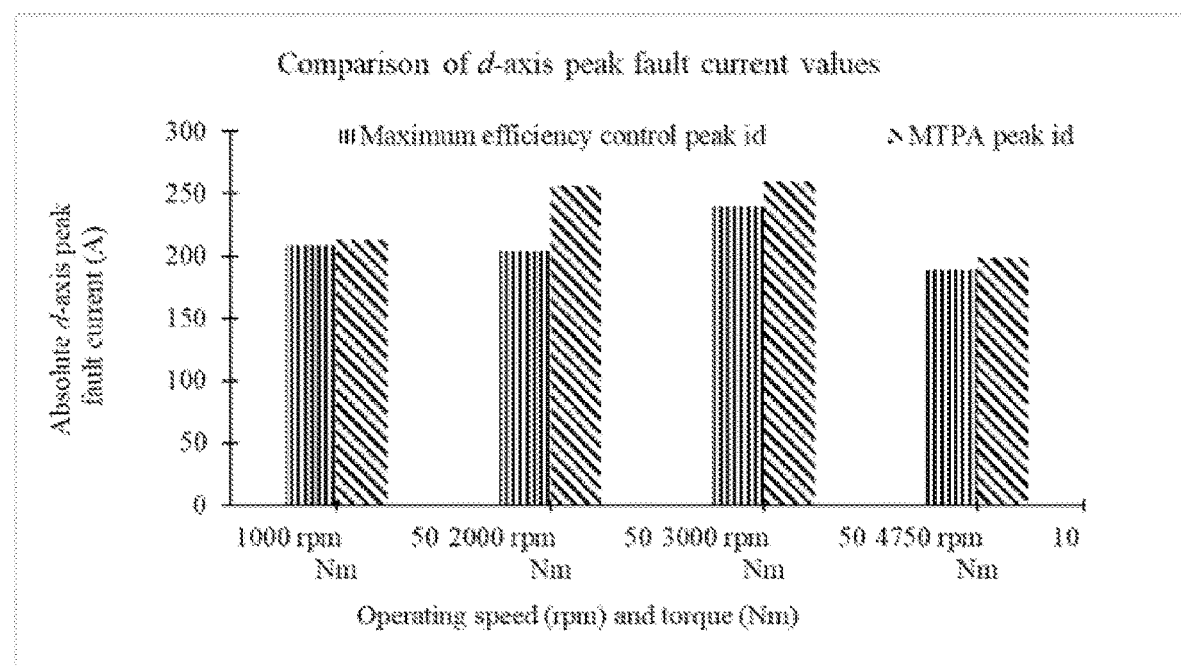
FIG. 6 shows a graph illustrating a comparison of d-axis peak fault current values.

Improved Short-Circuit Performance of Motor-Drive System with Maximum Efficiency LUT Based Control Technique:

In permanent magnet synchronous machines based e-drives, single phase asymmetric faults can cause serious damage to the inverter, motor and the DC link capacitor. Thus, as a method of fault protection strategy, a forced conversion to three-phase symmetrical short-circuit (SSC) operation is widely used. This is achieved by closing the top three switches and opening the bottom switches of a VSI, thus causing a symmetric short circuit in the motor windings. In some embodiments, the maximum efficiency LUT may be generated to provide maximum immunity to the e-drive during SSC. Large values of current angle γ prior to the SSC, the peak d-axis fault current magnitude can be reduced when compared to a lower γ. IN some embodiments, the generated LUT ensures that the machine is operating at the maximum current angle γ possible to obtain maximum efficiency and fault tolerance during SCC. FIG. 6 shows the various d- and q- axis currents generated using the systems and methods described herein and compared with the d- and q- axis currents obtained using conventional MTPA method. The magnitudes of peak d- axis currents are also compared. Thus, by generating the maximum efficiency LUT, the peak d-axis current magnitude during a SSC can be reduced, thus reducing the risk of demagnetization.

Figure 3:
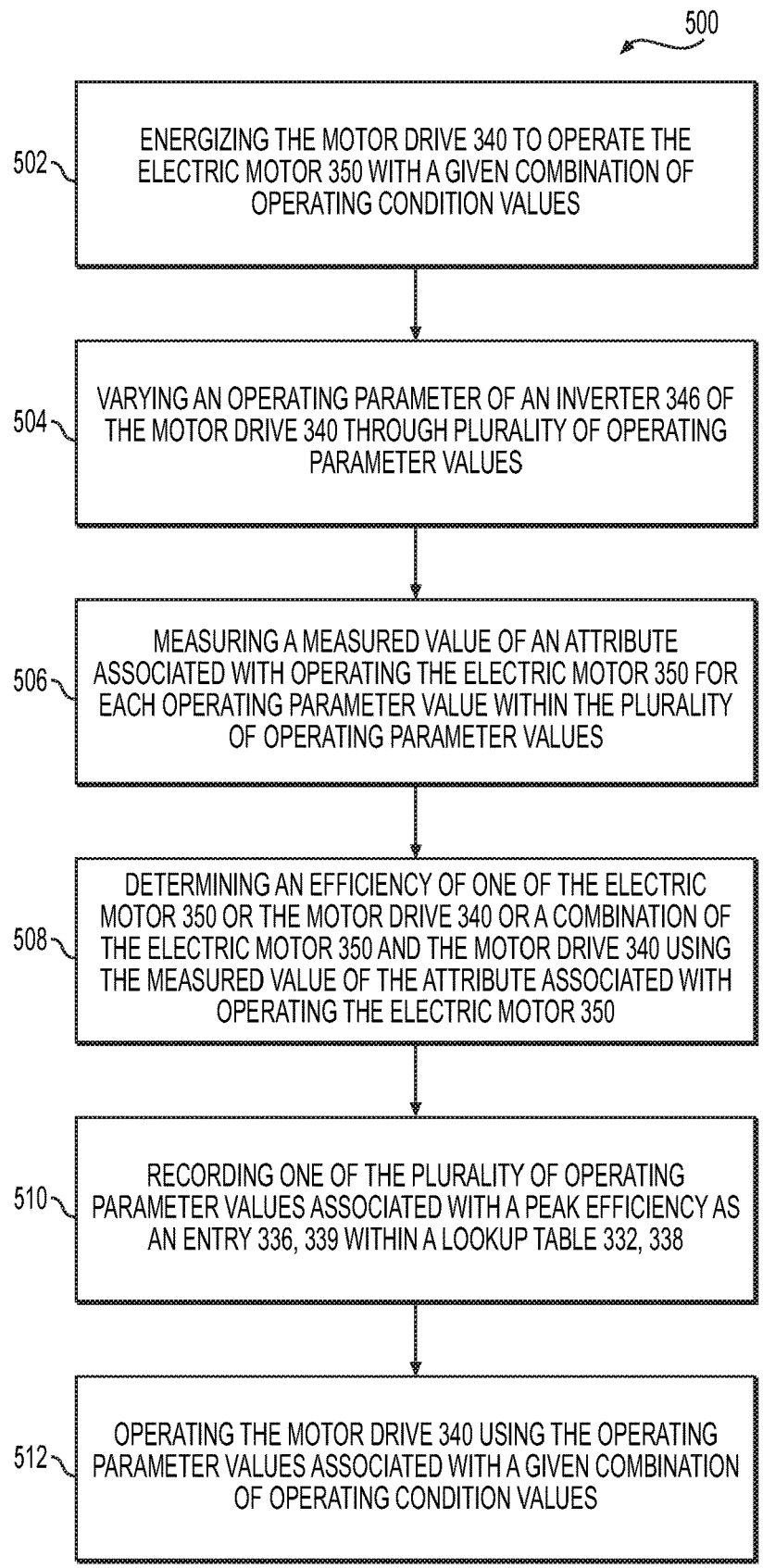
FIG. 3 is a flow chart of steps in a first method for in accordance with some embodiments of the present disclosure.

A first method 500 of operating a motor drive 340 is shown in the flow chart of FIG. 3. The first method 500 includes repeating one or more steps for each of a plurality of different operating condition values of an electric motor 350. The operating condition values may include corresponding values for one or more of a rotational speed w, an output torque $T_e$, and/or a temperature t. Specifically, the first method 500 includes energizing the motor drive 340 to operate the electric motor 350 with a given combination of operating condition values at step 502.

The first method 500 also includes varying an operating parameter of an inverter 346 of the motor drive 340 through a plurality of operating parameter values at step 504. The operating parameter to be varied may be a component or aspect of an output current command 334 and may include one or more of a current advance angle γ, a peak current value $I_m$, a direct axis current $I_d$ or a quadrature axis current $I_q$.

The first method 500 also includes measuring a measured value of an attribute associated with operating the electric motor 350 for each operating parameter value within the plurality of operating parameter values at step 506. In some embodiments, this step 506 may include measuring only values within the motor drive 340, which may include currents and/or voltages upon the motor leads 341. In other words, step 506 may not include direct measurement of external values, such as output torque $T_e$ of the electric motor 350. The attribute associated with operating the electric motor 350 may include one or more of: a current supplied to the electric motor 350 by the motor drive 340, a line-to-line voltage of the electric motor 350 (i.e., a line-to-line voltage of a given pair of the motor leads 341), a DC current supplied to the inverter 346, a DC voltage of a DC link bus 348 within the motor drive 340, an input power of the motor drive 340, an output power of the electric motor 350, an efficiency of the electric motor 350, an efficiency of the motor drive 340, or a combined efficiency of the motor drive 340 and the electric motor 350.

The first method 500 also includes determining an efficiency of one of the electric motor 350 or the motor drive 340 or a combination of the electric motor 350 and the motor drive 340 using the measured value of the attribute associated with operating the electric motor 350 at step 508. This step 508 may be performed using data recorded during controlled conditions, such as with the electric motor 350 connected to a dynamometer 360, as shown in the system 300 of FIG. 1.

The first method 500 also includes recording one of the plurality of operating parameter values associated with a peak efficiency as an entry 336, 339 within a lookup table 332, 338 at step 510, with the entry 336, 339 being associated with the one of the plurality of operating condition values. In some embodiments, the peak efficiency may be one of an efficiency of the electric motor 350, an efficiency of the motor drive 340, or a combined efficiency of the motor drive 340 and the electric motor 350.

In some embodiments, first method 500 also includes operating the motor drive 340 using the operating parameter values (e.g., a particular output current command 334) associated with a given combination of operating condition values (e.g., rotational speed w and output torque $T_e$) at step 512. This step 512 may include obtaining the associated operating parameter values from an entry 336, 339 within a lookup table 332, 338, where the entry 336, 339 is associated with the given combination of operating condition values For example, when the operating condition values call for a given rotational speed ω, and a given output torque $T_e$, the system 300 may use the values from the lookup table 332 that are associated with that given rotational speed ω, and a given output torque $T_e$ in order to determine an output current command 334 for use by the inverter 346 in generating the AC power to be supplied to the electric motor 350, such that the given output torque $T_e$ is achieved, while also minimizing energy usage by the system 300.

In some embodiments, each of the entries 336, 339 within the lookup table 332, 338 may be associated with a rotational speed ω and an output torque $T_e$ of the electric motor 350. In some embodiments, each of the entries 336, 339 within the lookup table 332, 338 may be associated with a temperature of the electric motor 350.

Figure 4:
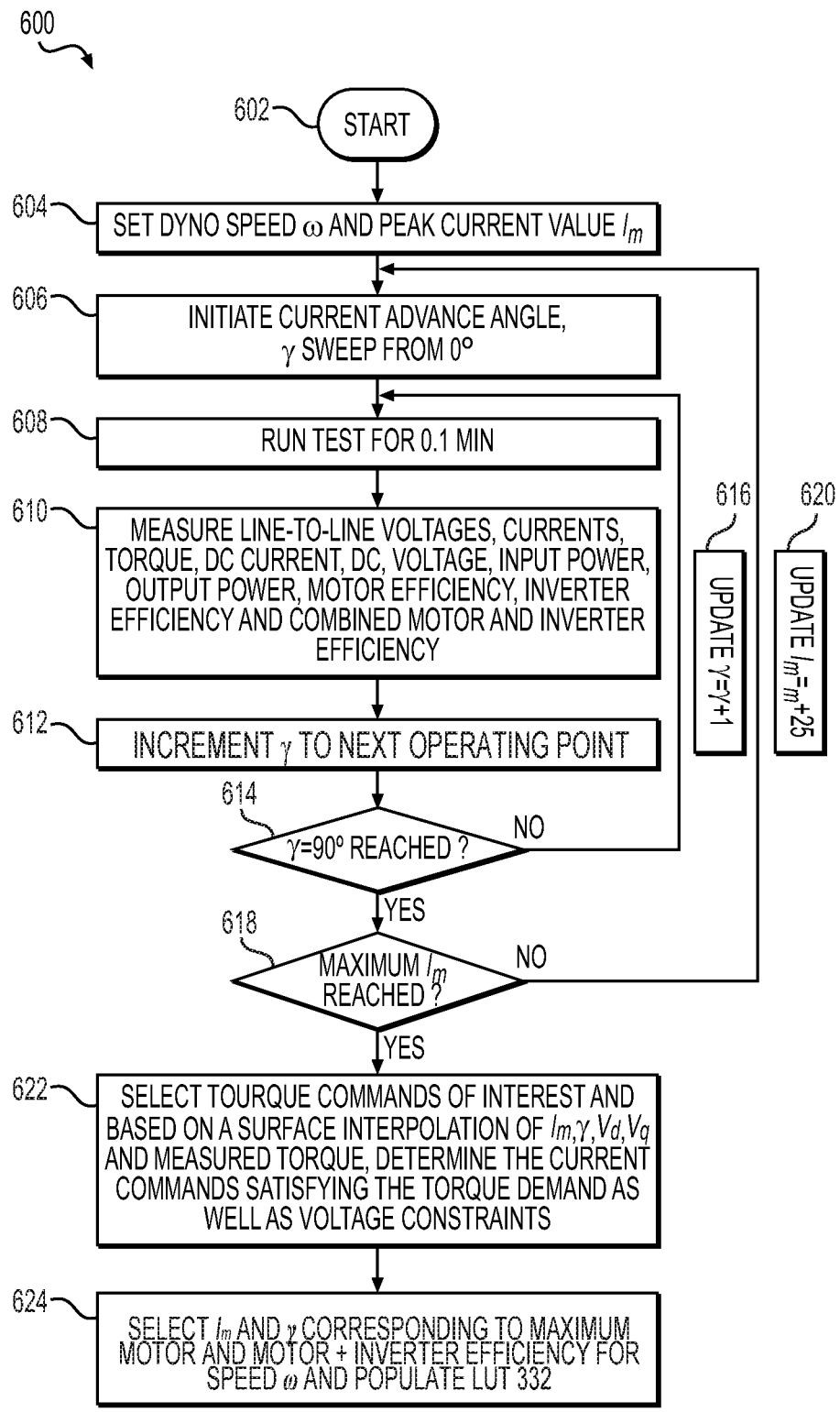
FIG. 4 is a flow chart of steps in a second method for in accordance with some embodiments of the present disclosure.

A second method 600 of operating a motor drive 340 is shown in the flow chart of FIG. 4. The second method 600 includes performing an initial sweep for a series of peak current values $I_m$ and current advance angle γ while measuring and recording measuring values of a plurality of attributes associated with operating the electric motor 350. In some embodiments, Multiple output current commands 334 that satisfy a particular output torque $T_e$ are selected using a surface interpolation, and the output current commands 334 that correspond to maximum system efficiency (as measured experimentally) are stored in a lookup table 332, 338. Some or all of the output current commands 334 may take the form of direct current value $i_d$, and a quadrature current value $i_q$.

The second method 600 starts at step 602 and includes setting an initial motor speed ω and an initial peak current value $I_m$ at step 604. The second method 600 proceeds by repeating an outer loop (steps 606 through 614) until a predetermined maximum peak current value $I_m$ is reached. The outer loop includes: initiating a current advance angle γ to an initial value at step 606. The initial value for the current advance angle γ may be, for example, zero degrees. However, the initial value for the current advance angle γ may be higher or lower than zero degrees.

The outer loop also includes repeating an inner loop (steps 608-612) until a predetermined maximum current advance angle γ is reached. The predetermined maximum current advance angle γ may be 90-degrees. However, the predetermined maximum current advance angle γ may be higher or lower than 90-degrees.

The inner loop of the second method 600 includes running a test for a predetermined period of time at step 608. The test may include running the electric motor 350 using an inverter 346 set according to a given current advance angle γ and a given peak current value $I_m$. The predetermined period of time may be, for example, 0.1 minute, or 6 seconds. The predetermined period of time may be longer or shorter. The predetermined period of time may be long enough for stable and reliable measurements to be obtained, such as from a dynamometer 360.

The inner loop of the second method 600 also includes measuring values of a plurality of attributes associated with operating the electric motor 350 at step 610. The attributes associated with operating the electric motor 50 may include one or more of: a current supplied to the electric motor 350 by the motor drive 340, a line-to-line voltage of the electric motor 350 (i.e., a line-to-line voltage of a given pair of the motor leads 341), a DC current supplied to the inverter 346, a DC voltage of a DC link bus 348 within the motor drive 340, an input power of the motor drive 340, an output power of the electric motor 350, an efficiency of the electric motor 350, an efficiency of the motor drive 340, or a combined efficiency of the motor drive 340 and the electric motor 350.

The inner loop of the second method 600 also includes evaluating the current advance angle γ to determine if the predetermined maximum current advance angle γ is reached at step 614 and returning to step 608 if the current advance angle γ is not yet up to the predetermined maximum current advance angle γ.

The inner loop of the second method 600 also includes incrementing the current advance angle γ by a first predetermined amount. The first predetermined amount may be, for example, 1-degree. However, the first predetermined amount may be higher or lower than 1 degree. The step of incrementing the current advance angle γ may be performed before step 614 (evaluating the current advance angle γ). For example, the current advance angle γ may be incremented at step 612, as shown in the flow chart of FIG. 4. Alternatively, the step of incrementing the current advance angle γ may be performed after step 614 (evaluating the current advance angle γ). For example, the current advance angle γ may be incremented at step 616, as shown in the flow chart of FIG. 4.

The outer loop of the second method 600 includes evaluating the peak current value $I_m$ until a predetermined maximum peak current value $I_m$ is reached at step 618 and returning to step 606 if the peak current value $I_m$ is not yet up to the predetermined maximum peak current value $I_m$.

The outer loop of the second method 600 includes incrementing the peak current value $I_m$ by a second predetermined amount at step 620. The second predetermined amount may be 25 Amps, as shown in FIG. 4. However, the second predetermined amount may be greater than or less than 25 Amps.

The second method 600 continues with selecting torque commands of interest, and determining the output current commands 334 that satisfy a demand for output torque $T_e$ and voltage constraints at step 622. This step 622 of determining the output current commands 334 that satisfy the torque demand and voltage constraints may include using one or more of a surface interpolation of the peak current value $I_m$, the current advance angle γ, a direct axis voltage $V_d$, a quadrature axis voltage $V_q$, and/or measured torque $T_{measured}$.

The second method 600 concludes with selecting the peak current value $I_m$ and the current advance angle γ corresponding to maximum motor efficiency and/or combined motor and inverter efficiency for the initial motor speed ω, and recording the peak current value $I_m$ and current advance angle γ as an entry 336 within a first lookup table 332 associated with the initial motor speed ω at step 624. In other words, step 624 populates the first lookup table (LUT) 332 with the entries 336.

According to some embodiments, the second method 600 comprises: setting an initial motor speed and an initial peak current value; and repeating an outer loop until a predetermined maximum peak current value is reached. The outer loop includes: initiating a current advance angle to an initial value; repeating an inner loop until a predetermined maximum current advance angle is reached; and incrementing the peak current value by a second predetermined amount. The inner loop includes: running a test for a predetermined period of time; measuring a plurality of attributes associated with operating the electric motor; and incrementing the current advance angle by a first predetermined amount.

The second 600 method continues with selecting torque commands of interest, and determining the output current commands satisfying the torque demand and voltage constraints based on a surface interpolation of the peak current value, the current advance angle, a direct axis voltage, a quadrature axis voltage, and measured torque. The second method concludes with selecting the peak current value and the current advance angle corresponding to maximum motor efficiency and combined motor and inverter efficiency for the initial motor speed, and recording that peak current value and current advance angle as an entry within a first lookup table associated with the initial motor speed.

Figure 5:
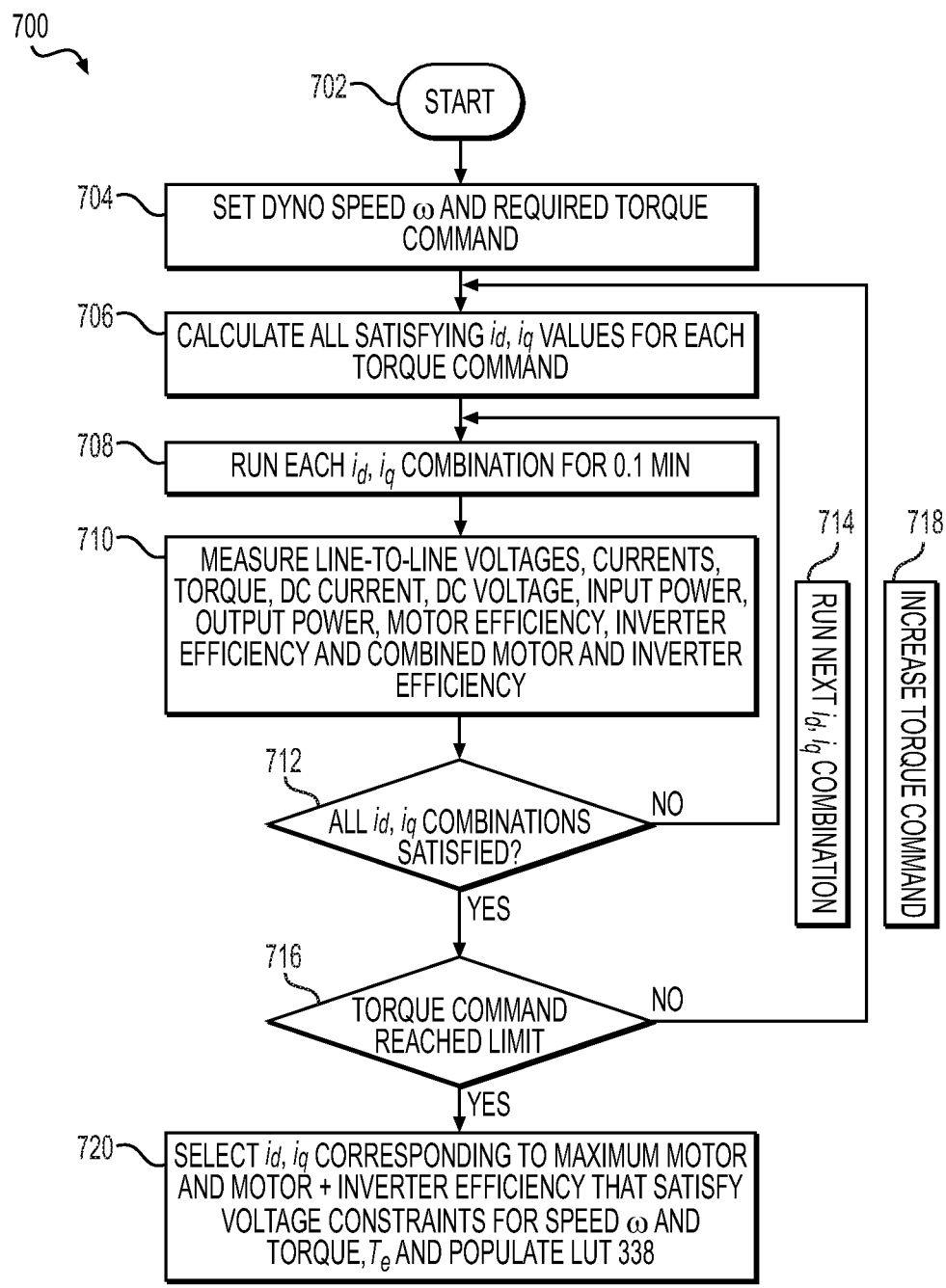
FIG. 5 is a flow chart of steps in a third method for in accordance with some embodiments of the present disclosure.

A third method 700 of operating a motor drive 340 is shown in the flow chart of FIG. 5. The third method 700 may be similar to the second method 600, except the third method 700 derives the output current commands 334 satisfying a particular demand for output torque $T_e$ simultaneously during the experimental search procedure instead of through post-processed interpolations.

The third method 700 starts at step 702 and includes setting an initial value for the motor speed w and an initial torque command value $T_{command}$ for the output torque $T_e$ at step 704. The third method 700 proceeds by repeating an outer loop (steps 706 through 712) until a predetermined maximum torque command value $T_{max}$ is reached The outer loop includes: calculating a direct axis current value $i_d$ and a quadrature axis current value $i_q$ for the torque command value $T_{command}$ for output torque $T_e$ at step 706.

The third method 700 proceeds by repeating an inner loop until all combinations of the direct axis current values $i_d$ and the quadrature axis current values $i_q$ are satisfied.

The inner loop of the third method 700 includes running the motor drive 340 using for a predetermined period of time at step 708. This step 708 may include running the electric motor 350 using an inverter 346 set according to a given direct axis current value $i_d$ and set according to a given quadrature axis current value $i_q$. The predetermined period of time may be, for example, 0.1 minute, or 6 seconds. The predetermined period of time may be longer or shorter. The predetermined period of time may be long enough for stable and reliable measurements to be obtained, such as from a dynamometer 360.

The inner loop of the third method 700 also includes: measuring values of a plurality of attributes associated with operating the electric motor 350 at step 710. The attributes associated with operating the electric motor 350 may include one or more of: a current supplied to the electric motor 350 by the motor drive 340, a line-to-line voltage of the electric motor 350 (i.e., a line-to-line voltage of a given pair of the motor leads 341), a DC current supplied to the inverter 346, a DC voltage of a DC link bus 348 within the motor drive 340, an input power of the motor drive 340, an output power of the electric motor 350, an efficiency of the electric motor 350, an efficiency of the motor drive 340, or a combined efficiency of the motor drive 340 and the electric motor 350.

The inner loop of the third method 700 also includes evaluating the direct axis current value $i_d$ and the quadrature axis current value $i_q$ to determine all combinations the direct axis current value $i_d$ and the quadrature axis current value $i_q$ within ranges of interest are satisfied at step 712, and returning to step 708 if all combinations the direct axis current value $i_d$ and the quadrature axis current value $i_q$ within ranges of interest are not yet satisfied.

The inner loop of the third method 700 also includes incrementing the direct axis current value $i_d$ and the quadrature axis current value $i_q$ by predetermined amounts at step 714. The direct axis current value $i_d$ and the quadrature axis current value $i_q$ may be incremented together or independently. For example, step 714 may include nested loops that step through a range of values for the quadrature axis current value $i_q$, and which then increment the direct axis current value $i_d$ before repeating stepping the quadrature axis current value $i_q$ through the range of values again, until all combinations of the direct axis current value $i_d$ and the quadrature axis current value $i_q$ within the respective values of interest have been used.

The outer loop of the third method 700 also includes evaluating the torque command value $T_{command}$ for output torque $T_e$ until a predetermined maximum torque command value $T_{max}$ is reached at step 716 and returning to step 706 if the torque command value $T_{command}$ is not yet up to the predetermined maximum torque command value $T_{max}$ The outer loop of the third method 700 also includes incrementing the torque command value $T_{command}$ by a predetermined amount at step 718.

The third method 700 concludes with selecting the direct axis current value $i_d$ and the quadrature axis current value $i_q$ corresponding to maximum motor efficiency and/or combined motor and inverter efficiency and which satisfy voltage constraints for the speed ω and the torque command value $T_{command}$ and storing the selected direct axis current value $i_d$ and quadrature axis current value $i_q$ corresponding to each combination of the motor speed w and the torque command value $T_{command}$ for output torque $T_e$ as entries 339 in a second lookup table 338 step 720. In other words, step 720 populates the second lookup table (LUT) 338 with the entries 339.

According to some embodiments, the third method 700 comprises: setting an initial motor speed and an initial torque command value; and repeating an outer loop until a predetermined maximum torque command value is reached. The outer loop includes: calculating a direct axis current value and a quadrature axis current value for the torque command value; repeating an inner loop until all of the combinations of the direct axis current and the quadrature axis current are satisfied; and incrementing the torque command value by a predetermined amount. The inner loop includes: running the motor drive using a combination of the direct axis current and the quadrature axis current for a predetermined period of time; measuring a plurality of attributes associated with operating the electric motor; and selecting a different combination of the direct axis current value and the quadrature axis current value. The third method concludes with selecting the direct axis current value and the quadrature axis current value corresponding to maximum motor efficiency and combined motor and inverter efficiency and which satisfy voltage constraints for the speed and the torque command value and populate a second lookup table with the selected direct axis current and quadrature axis current corresponding to each combination of the motor speed and torque command value.

In some embodiments, an electric motor drive system for determining optimized efficiency includes: a system controller including a processor coupled to a machine readable storage memory holding a lookup table; a motor drive including a drive controller and an inverter, the drive controller configured to control the inverter to generate an alternating current power upon a motor lead; an electric motor configured to convert the alternating current power from the motor lead to rotational energy upon a shaft; wherein the system controller is configured to determine an output current command for optimized efficiency associated with each of a plurality of different combinations of speed and output torque of the electric motor; and wherein the system controller is configured to store the output current commands as entries within the lookup table indexed by a rotational speed and an output torque of the electric motor.

In some embodiments, the system also includes: a dynamometer including a load coupled to the shaft, and a plurality of sensors configured to measure operating characteristics of the electric motor, and a dyno controller in communication with the plurality of sensors and configured to measure a speed and an output torque of the electric motor; and wherein the system controller is in communication with the dyno controller for receiving data indicating the speed and the output torque of the electric motor. In some embodiments, the system also includes a temperature sensor configured to measure a temperature within the electric motor; wherein the system is configured to determine an output current command for optimized efficiency associated with each of a plurality of different combinations of temperature and speed and output torque of the electric motor; and wherein the system controller is configured to store the output current commands as entries within the lookup table indexed by the temperature and the speed and the output torque of the electric motor. In some embodiments, the electric motor is a permanent magnet (PM) machine having a rotor with one or more permanent magnets; and further comprising: a flux linkage determination algorithm configured to determine a value of a magnetic flux produced by the one or more permanent magnets within the rotor of the electric motor; and wherein the system controller is configured to adjust the output current command based upon the value of the magnetic flux. In some embodiments, the system also includes a temperature sensor configured to measure a temperature within the electric motor; wherein the flux linkage determination algorithm uses the temperature within the electric motor to determine the value of the magnetic flux produced by the one or more permanent magnets within the rotor of the electric motor. In some embodiments, the flux linkage determination algorithm uses one or more operational parameters from the motor drive to determine the value of the magnetic flux produced by the one or more permanent magnets within the rotor of the electric motor.

In some embodiments, a method of operating a motor drive includes, for each of a plurality of operating condition values of an electric motor: energizing the motor drive to operate the electric motor with one of the plurality of operating condition values; varying an operating parameter of an inverter of the motor drive through a plurality of operating parameter values; measuring a measured value of an attribute associated with operating the electric motor for each operating parameter value within the plurality of operating parameter values; determining an efficiency of one of the electric motor or the motor drive or the combination of the electric motor and the motor drive using the measured value of the attribute associated with operating the electric motor; and recording one of the plurality of operating parameter values associated with a peak efficiency as an entry within a lookup table, with the entry being associated with the one of the plurality of operating condition values.

In some embodiments, the operating condition includes at least one of a rotational speed, an output torque, or a temperature. In some embodiments, each of the entries within the lookup table is associated with a rotational speed and an output torque. In some embodiments, each of the entries within the lookup table is associated with a temperature. In some embodiments, the attribute associated with operating the electric motor includes at least one of: a current supplied to the electric motor by the motor drive, a line-to-line voltage of the electric motor, a DC current supplied to the inverter, a DC voltage of a DC link bus within the motor drive, an input power of the motor drive, an output power of the electric motor, an efficiency of the electric motor, an efficiency of the motor drive, or a combined efficiency of the motor drive and the electric motor. In some embodiments, the operating parameter includes a current advance angle ($\gamma$). In some embodiments, the operating parameter includes a peak current value (Im). In some embodiments, the operating parameter includes a direct axis current (Id). In some embodiments, the operating parameter includes a quadrature axis current (Iq). In some embodiments, the peak efficiency is one of an efficiency of the electric motor, an efficiency of the motor drive, or a combined efficiency of the motor drive and the electric motor. In some embodiments, the peak efficiency is the combined efficiency of the motor drive and the electric motor. In some embodiments, the method also includes: operating the motor drive using the one of the plurality of operating parameter values associated with a given combination of the plurality of operating condition values.

In some embodiments, a method of operating a motor drive includes: setting an initial motor speed and an initial peak current value; repeating, until a predetermined maximum peak current value is reached: initiating a current advance angle to an initial value; repeating, until a predetermined maximum current advance angle is reached: running a test for a predetermined period of time; measuring a plurality of attributes associated with operating the electric motor; and incrementing the current advance angle by a first predetermined amount; incrementing the peak current value by a second predetermined amount; selecting torque commands of interest, and determining the output current commands satisfying the torque demand and voltage constraints based on a surface interpolation of the peak current value, the current advance angle, a direct axis voltage, a quadrature axis voltage, and measured torque; selecting the peak current value and the current advance angle corresponding to maximum motor efficiency and combined motor and inverter efficiency for the initial motor speed, and recording the peak current value and the current advance angle as an entry within a first lookup table associated with the initial motor speed.

In some embodiments, a method of operating a motor drive includes: setting an initial motor speed and an initial torque command value; repeating, until a predetermined maximum torque command value is reached: calculating a direct axis current value and a quadrature axis current value for the torque command value; repeating, until all of the combinations of the direct axis current value and the quadrature axis current value are satisfied: running the motor drive using a combination of the direct axis current value and the quadrature axis current value for a predetermined period of time; measuring a plurality of attributes associated with operating the electric motor; selecting a different combination of the direct axis current value and the quadrature axis current value; incrementing the torque command value by a predetermined amount; selecting the direct axis current value and the quadrature axis current value corresponding to maximum motor efficiency and combined motor and inverter efficiency and which satisfy voltage constraints for a speed and for the torque command value, and populate a second lookup table with a selected direct axis current and quadrature axis current corresponding to each combination of the speed and torque command value.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor drive system for determining optimized efficiency, comprising:
    a system controller including a processor coupled to a machine readable storage memory holding a lookup table;
    a motor drive including a drive controller and an inverter, the drive controller configured to control the inverter to generate an alternating current power upon a motor lead; and an electric motor configured to convert the alternating current power from the motor lead to rotational energy upon a shaft;

wherein the system controller is configured to determine an output current command for optimized efficiency associated with each of a plurality of different combinations of a rotational speed and an output torque of the electric motor;

wherein the system controller is configured to store the output current commands as entries within the lookup table indexed by the rotational speed, and the output torque of the electric motor.

2. The system of claim 1, further comprising:
a dynamometer including a load coupled to the shaft, and a plurality of sensors configured to measure operating characteristics of the electric motor, and a dyno controller in communication with the plurality of sensors and configured to measure the rotational speed and the output torque of the electric motor; and wherein the system controller is in communication with the dyno controller for receiving data indicating the rotational speed and the output torque of the electric motor.

3. The system of claim 1, further comprising a temperature sensor configured to measure a temperature of the electric motor;

wherein the system is configured to determine an output current command for optimized efficiency associated with each of a plurality of different combinations of the temperature, the rotational speed, and the output torque of the electric motor; and wherein the system controller is configured to store the output current commands as entries within the lookup table indexed by the temperature, the rotational speed, and the output torque of the electric motor.

4. The system of claim 1, wherein the lookup table is one of a plurality of different lookup tables, with each of the plurality of different lookup tables corresponding to a different switching frequency of the inverter.

5. The system of claim 1, wherein the electric motor is a permanent magnet (PM) machine having a rotor with one or more permanent magnets; and further comprising:
a flux linkage determination algorithm configured to determine a value of a magnetic flux produced by the one or more permanent magnets within the rotor of the electric motor; and wherein the system controller is configured to adjust the output current command based upon the value of the magnetic flux.

6. The system of claim 5, wherein the flux linkage determination algorithm uses the temperature within the electric motor to determine the value of the magnetic flux produced by the one or more permanent magnets within the rotor of the electric motor.

7. The system of claim 5, wherein the flux linkage determination algorithm uses one or more operational parameters from the motor drive to determine the value of the magnetic flux produced by the one or more permanent magnets within the rotor of the electric motor.

8. A method of operating a motor drive comprising:
for each of a plurality of operating condition values of an electric motor:
energizing the motor drive to operate the electric motor with one of the plurality of operating condition values;

varying an operating parameter of an inverter of the motor drive through a plurality of operating parameter values;

measuring a measured value of an attribute associated with operating the electric motor for each operating parameter value within the plurality of operating parameter values;

determining an efficiency of one of the electric motor or the motor drive or a combination of the electric motor and the motor drive using the measured value of the attribute associated with operating the electric motor; and recording one of the plurality of operating parameter values associated with a peak efficiency as an entry within a lookup table, with the entry being associated with the one of the plurality of operating condition values.

9. The method of claim 8, wherein the operating condition includes at least one of a rotational speed, an output torque, or a temperature.

10. The method of claim 8, wherein each of the entries within the lookup table is associated with a rotational speed and an output torque.

11. The method of claim 8, wherein each of the entries within the lookup table is associated with a temperature.

12. The method of claim 8, wherein the attribute associated with operating the electric motor includes at least one of: a current supplied to the electric motor by the motor drive, a line-to-line voltage of the electric motor, a DC current supplied to the inverter, a DC voltage of a DC link bus within the motor drive, an input power of the motor drive, an output power of the electric motor, an efficiency of the electric motor, an efficiency of the motor drive, or a combined efficiency of the motor drive and the electric motor.

13. The method of claim 8, wherein the operating parameter includes at least one of a current advance angle, a peak current value, a direct axis current, or a quadrature axis current.

14. The method of claim 13, wherein the operating parameter includes the current advance angle.

15. The method of claim 13, wherein the operating parameter includes the peak current value.

16. The method of claim 8, wherein the peak efficiency is one of an efficiency of the electric motor, an efficiency of the motor drive, or a combined efficiency of the motor drive and the electric motor.

17. The method of claim 16, wherein the peak efficiency is the combined efficiency of the motor drive and the electric motor.

18. The method of claim 16, further comprising: operating the motor drive using the one of the plurality of operating parameter values associated with a given combination of the plurality of operating condition values.

19. A method of operating a motor drive comprising:
setting an initial motor speed and an initial peak current value;

in response to a predetermined maximum peak current value being reached, initiating a current advance angle to an initial value;

in response to a predetermined maximum current advance angle being reached, performing a test for a predetermined period;

measuring a plurality of attributes associated with operating the motor drive;

incrementing the current advance angle by a first predetermined amount;

incrementing a peak current value by a second predetermined amount;
selecting torque commands of interest;
determining output current commands satisfying a torque demand and voltage constraints based on a surface interpolation of the peak current value, the current advance angle, a direct axis voltage, a quadrature axis voltage, and measured torque;
selecting the peak current value and the current advance angle corresponding to maximum motor efficiency and combined motor and inverter efficiency for the initial motor speed, and recording the peak current value and the current advance angle as an entry within a first lookup table associated with the initial motor speed.

20. The method of claim 19, further comprising:
calculating a direct axis current value and a quadrature axis current value for a torque command value;
in response to a determination that all of the combinations of the direct axis current value and the quadrature axis current value are satisfied, operating the motor drive using a combination of the direct axis current value and the quadrature axis current value for a predetermined period of time;
selecting a different combination of the direct axis current value and the quadrature axis current value;
incrementing the torque command value by a predetermined amount;
selecting the direct axis current value and the quadrature axis current value corresponding to maximum motor efficiency and combined motor and inverter efficiency; and
populating a second lookup table with a selected direct axis current and quadrature axis current corresponding to each combination of the speed and torque command value.

* * * * *